United States Patent
De Mers et al.

(10) Patent No.: US 12,511,923 B2
(45) Date of Patent: Dec. 30, 2025

(54) SCANNING AID FOR CAMERA-BASED SEARCHES

(71) Applicant: HONEYWELL INTERNATIONAL INC., Charlotte, NC (US)

(72) Inventors: Robert De Mers, Plymouth, MN (US); Tor Finseth, Plymouth, MN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 409 days.

(21) Appl. No.: 18/067,916

(22) Filed: Dec. 19, 2022

(65) Prior Publication Data
US 2024/0203142 A1    Jun. 20, 2024

(51) Int. Cl.
    G06V 20/70    (2022.01)
    G06V 10/22    (2022.01)
    G06V 20/17    (2022.01)

(52) U.S. Cl.
    CPC ............ G06V 20/70 (2022.01); G06V 10/235 (2022.01); G06V 20/17 (2022.01)

(58) Field of Classification Search
    CPC ....... G06V 20/70; G06V 20/17; G06V 10/235
    See application file for complete search history.

(56) References Cited

U.S. PATENT DOCUMENTS

| | | | |
|---|---|---|---|
| 10,690,772 B2 | 6/2020 | Van Voorst | |
| 11,307,584 B2 | 4/2022 | Jobanputra et al. | |
| 2018/0040140 A1 | 2/2018 | Rozenberg et al. | |
| 2019/0376890 A1* | 12/2019 | Bennett | G06T 7/73 |
| 2022/0092291 A1* | 3/2022 | Lai | G01S 17/42 |
| 2022/0253076 A1 | 8/2022 | Cleland-Huang et al. | |

FOREIGN PATENT DOCUMENTS

| | | |
|---|---|---|
| CN | 108038450 A | 5/2018 |
| FR | 3100075 B1 | 11/2021 |
| WO | 2022074643 A1 | 4/2022 |
| WO | 2022204296 A1 | 9/2022 |

OTHER PUBLICATIONS

XP093150696; Ruf Christian; "Adaptive Automationsmechanismen mit variablen Interaktions-und Prasentationsstrategien fur Sensorsysteme auf unbemannten Aufklarungsflugplattformen"; May 30, 2022; Retrieved from the Internet: URL:https://athene-forschung.rz.unibw-muen chen.de/doc/141652/141652.pdf [retrieved on Apr. 11, 2024] * pp. I,4,72-75,101-103,138; figures 3.13, 3.14,4.18,4.21-4.23 *.

* cited by examiner

*Primary Examiner* — Casey L Kretzer
(74) *Attorney, Agent, or Firm* — Ingrassia Fisher & Lorenz, LLP

(57) ABSTRACT

Methods and systems are provided for aiding in searches with an imaging sensor from a sensor platform. The method comprises utilizing the imaging sensor to detect multiple points of interest from the sensor platform. The multiple points of interest are displayed on an image display shown on a display device. Each point of interest is labeled on the image display and analyzed separately to determine details of the point of interest. Each analyzed point of interest is tagged on the image display with a distinctive marker to indicate completion of the analysis for that point of interest.

20 Claims, 5 Drawing Sheets

SCANNING AID FOR CAMERA-BASED SEARCHES

TECHNICAL FIELD

The present invention generally relates to aircraft operations, and more particularly relates to a scanning aid for camera-based searches from an aircraft in accordance with one embodiment.

BACKGROUND

Various governmental and law enforcement agencies carry out searches from the air often using infrared (IR) sensors or cameras. Search personnel may be looking for someone crossing a border illegally or looking for a child lost in the woods for example. It is common under these circumstances, to adjust the settings on the IR camera so that only hotpots are shown. This removes the background light that can conceal points of interest so that each hotspot can be examined in detail without spending time on low interest areas. However, this can make it difficult to carry out a systematic search since all positional references are removed with the background imagery. Operators may end up examining hotspots multiple times, because they lose track of what has already examined. Hence, there is a need for a scanning aid for camera-based searches.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for aiding in searches with an imaging sensor from a sensor platform. The method comprises: utilizing the imaging sensor to detect multiple points of interest from the sensor platform; displaying the multiple points of interest on an image display shown on a display device; labeling each point of interest on the image display; analyzing each point of interest separately on the image display to determine details of the point of interest; and tagging each analyzed point of interest on the image display with a distinctive marker to indicate completion of the analysis for the analyzed point of interest.

A system is provided for aiding in searches from a sensor platform. The system comprises: an imaging sensor that detects multiple points of interest from the sensor platform; and a display device on board the sensor platform that displays the multiple points of interest on an image display, where the display device allows a user to, label each point of interest on the image display, analyze each point of interest separately on the image display to determine details of the point of interest, and tag each analyzed point of interest on the image display with a distinctive marker to indicate completion of the analysis for the analyzed point of interest.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may be separate from, or integrated within, a preexisting mobile platform management system, avionics system, or aircraft flight management system (FMS).

Methods and systems have been developed for aiding in searches with an imaging sensor from an sensor platform. The method comprises utilizing the imaging sensor to detect multiple points of interest from the sensor platform. The multiple points of interest are displayed on an image display shown on a display device. Each point of interest is labeled on the image display and analyzed separately to determine details of the point of interest. Each analyzed point of interest is tagged on the image display with a distinctive marker to indicate completion of the analysis for that point of interest.

Figure 1:
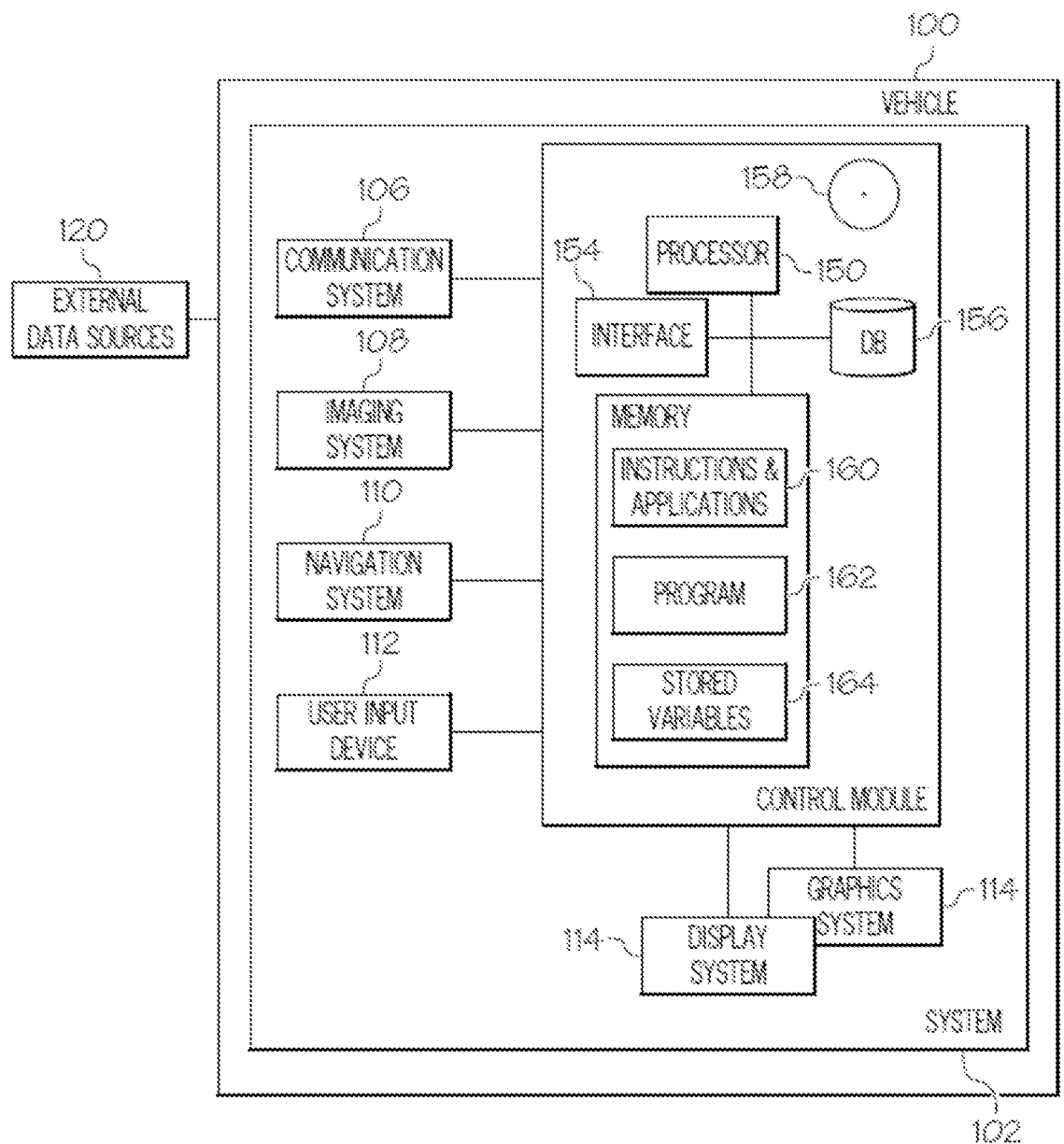
FIG. 1 shows a block diagram of an imaging system on a vehicle in accordance with one embodiment.

Turning now to FIG. 1, in the depicted embodiment, the vehicle system 102 includes: the control module 104 that is operationally coupled to a communication system 106, an imaging system 108, a navigation system 110, a user input device 112, a display system 114, and a graphics system 116. The operation of these functional blocks is described in more detail below. In the described embodiments, the depicted vehicle system 102 is generally realized as an aircraft flight deck display system within a vehicle 100 that is an aircraft; however, the concepts presented here can be deployed in a variety of mobile platforms, such as land vehicles, spacecraft, watercraft, and the like. Accordingly, in various embodiments, the vehicle system 102 may be associated with or form part of larger aircraft management system, such as a flight management system (FMS).

In the illustrated embodiment, the control module 104 is coupled to the communications system 106, which is configured to support communications between external data source(s) 120 and the aircraft. External source(s) 120 may comprise air traffic control (ATC), or other suitable command centers and ground locations. Data received from the external source(s) 120 includes the instantaneous, or current, visibility report associated with a target landing location or identified runway. In this regard, the communications system 106 may be realized using a radio communication system or another suitable data link system.

The imaging system 108 is configured to use sensing devices to generate video or still images and provide image data therefrom. The imaging system 108 may comprise one or more sensing devices, such as cameras, each with an associated sensing method. Accordingly, the video or still images generated by the imaging system 108 may be referred to herein as generated images, sensor images, or sensed images, and the image data may be referred to as sensed data. In an embodiment, the imaging system 108 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 108 comprises a radar based video camera system. Radar based systems emit pulses of electromagnetic radiation and listen for, or sense, associated return echoes. The radar system may generate an image or video based upon the sensed echoes. In another embodiment, the imaging system 108 may comprise a sonar system. The imaging system 108 uses methods other than visible light to generate images, and the sensing devices within the imaging system 108 are much more sensitive than a human eye. Consequently, the generated images may comprise objects, such as mountains, buildings, or ground objects, that a pilot might not otherwise see due to low visibility conditions.

In various embodiments, the imaging system 108 may be mounted in or near the nose of the aircraft (vehicle 100) and calibrated to align an imaging region with a viewing region of a primary flight display (PFD) or a Head Up display (HUD) rendered on the display system 114. For example, the imaging system 108 may be configured so that a geometric center of its field of view (FOV) is aligned with or otherwise corresponds to the geometric center of the viewing region on the display system 114. In this regard, the imaging system 108 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 114 are three dimensional, and the imaging system 108 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 110, or other aircraft and/or flight management systems.

Navigation system 110 is configured to provide real-time navigational data and/or information regarding operation of the aircraft. The navigation system 110 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth.

The user input device 112 is coupled to the control module 104, and the user input device 112 and the control module 104 are cooperatively configured to allow a user (e.g., a pilot, co-pilot, or crew member) to interact with the display system 114 and/or other elements of the vehicle system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, and loading and updating the contents of the database 156, each described in more detail below.

The generated images from the imaging system 108 are provided to the control module 104 in the form of image data. The control module 104 is configured to receive the image data and convert and render the image data into display commands that command and control the renderings of the display system 114. This conversion and rendering may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations or displayed images based on the image data (i.e., sensor based images) and associated with operation of the vehicle 100, as described in greater detail below. In various embodiments, images displayed on the display system 114 may also be responsive to processed user input that was received via a user input device 112.

In general, the display system 114 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 114 may be part of, or include, a primary flight display (PFD) system, a panel-mounted head down display (HDD), a head up display (HUD), or a head mounted display system, such as a "near to eye display" system. The display system 114 may comprise display devices that provide three dimensional or two dimensional images and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the vehicle system 102. With continued reference to FIG. 1, within the control module 104, the processor 150 and the memory 152 (having therein the program 162) form a novel processing engine that performs the described processing activities in accordance with the program 162, as is described in more detail below. The control module 104 generates display signals that command and control the display system 114.

The control module 104 includes an interface 154, communicatively coupled to the processor 150 and memory 152 (via a bus 155), database 156, and an optional storage disk 158. In various embodiments, the control module 104 performs actions and other functions in accordance with other embodiments. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 120 during an initialization step of a process.

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 120 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) or aircraft flight deck display.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, the processor 150 specifically loads and executes the novel program 162. Additionally, the processor 150 is configured to process received inputs (any combination of input from the communication system 106, the imaging system 108, the navigation system 110, and user input provided via user input device 112), reference the database 156 in accordance with the program 162, and generate display commands that command and control the display system 114 based thereon.

Embodiments of the present invention may use various types of imaging sensors, including: a forward looking infrared (FLIR) sensor; radio detection and ranging (RADAR); light detection and ranging (LIDAR); sound navigation and ranging (SONAR); night vision light amplification; and a standard long range camera. The present invention allows an operator to indicate prior searched space and tag each area of interest as they are checked. This greatly speeds up the search process by eliminating repetition and optimizing the search pattern. User tagging of areas of interest as they are examined will prevent useless repeated work.

Figure 2:
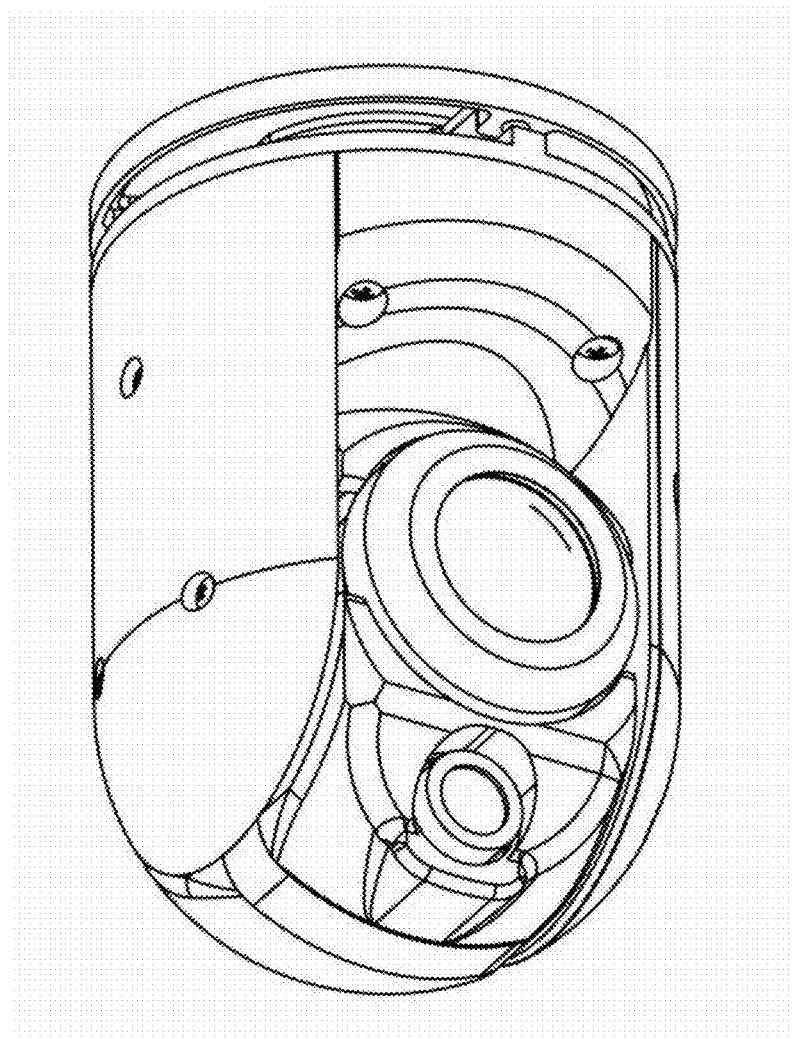
FIG. 2 shows a diagram of a forward looking infrared (FLIR) sensor in accordance with one embodiment.
Figure 3:
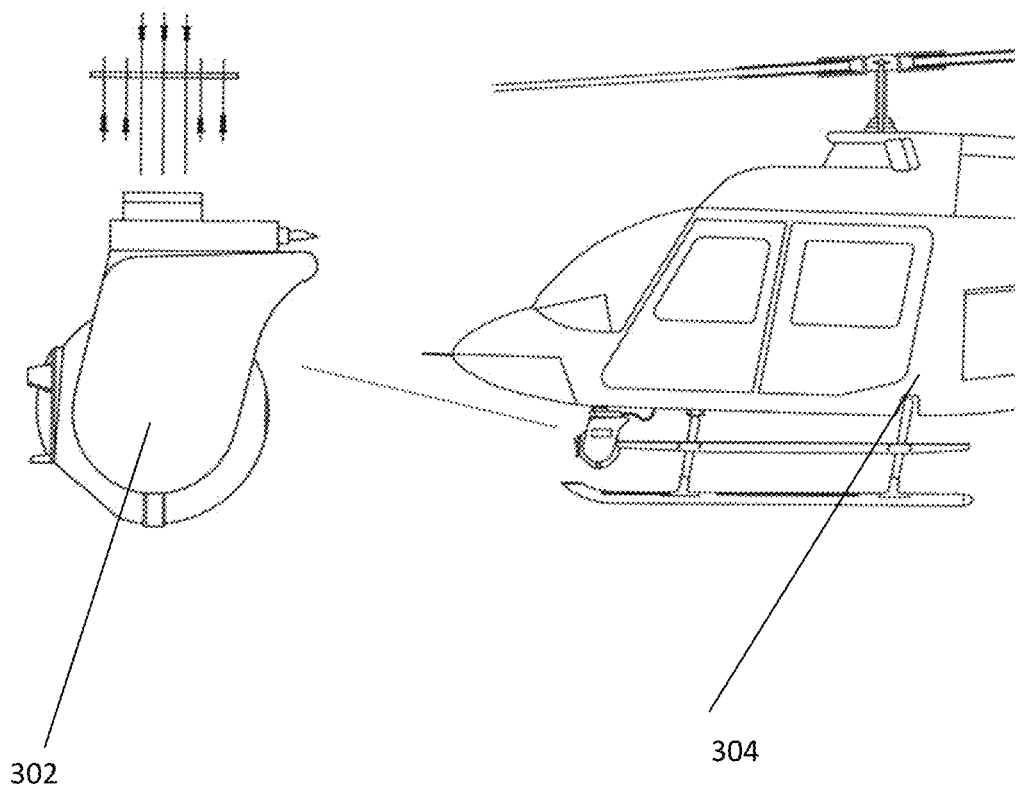
FIG. 3 shows a diagram of a FLIR sensor mounted on a helicopter in accordance with one embodiment.

Turning now to FIG. 2, a diagram is shown of a forward looking infrared (FLIR) sensor 200 in accordance with one embodiment. In FIG. 3, a diagram 300 of a FLIR sensor 302 mounted on a helicopter 304 in accordance with one embodiment. This FLIR sensor is used as part an airborne platform that is used for search and rescue operations. However, other embodiments could use different types of platforms including: aircraft; helicopters; unmanned aerial vehicles (UAV) both remotely piloted (RPV) and autonomous; inflatable observation balloons; stationary observation towers; ground vehicles; water borne platforms; handheld sensors; etc. Likely users of embodiments of the present invention include law enforcement agencies, border patrol, fire and rescue, wildfire responders, military and private security personnel.

Figure 4:
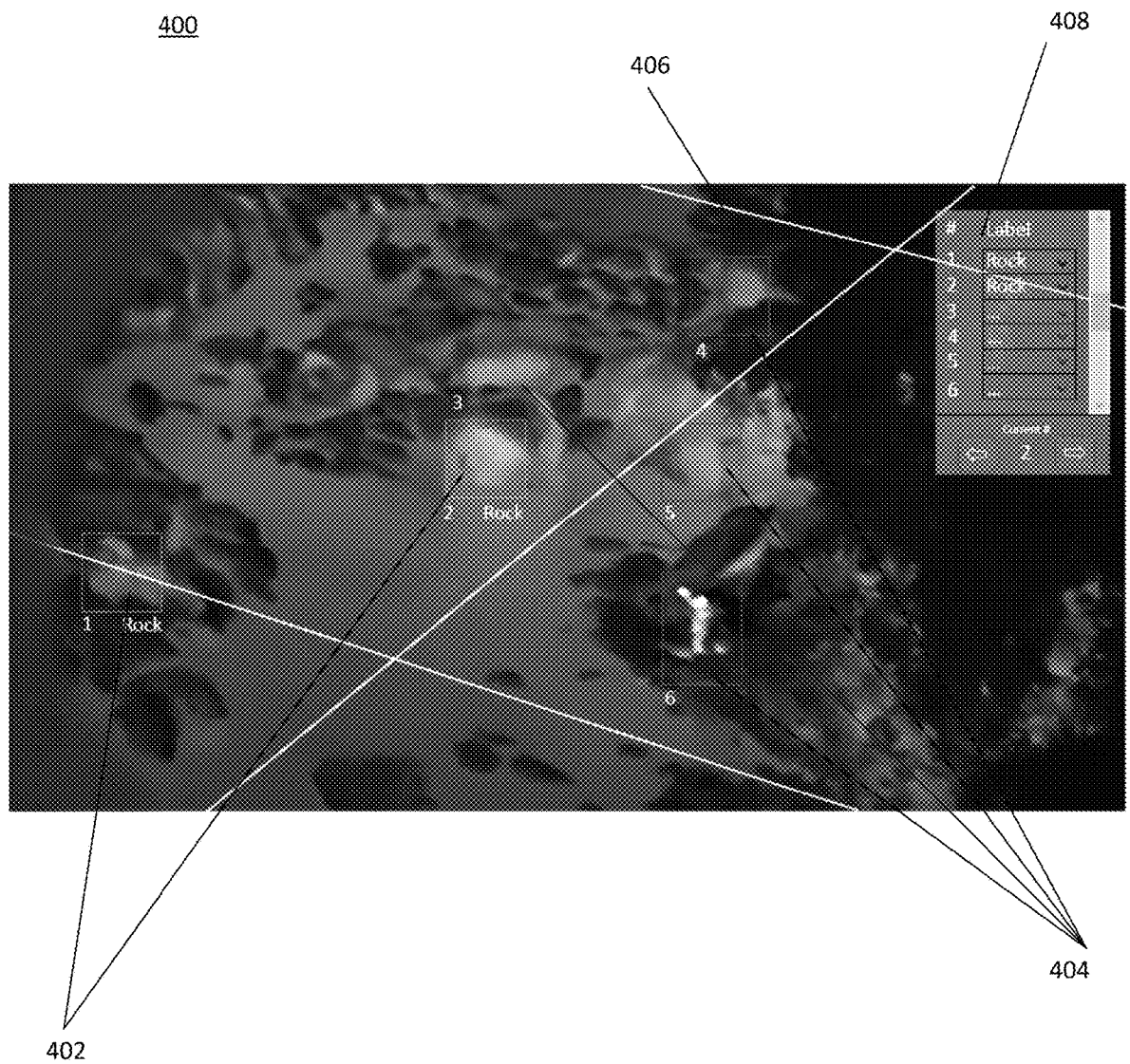
FIG. 4 shows a diagram of an image display in accordance with one embodiment.

Turning now to FIG. 4, a diagram 400 is shown of an image display in accordance with one embodiment. This example of an image display 400 is from a FLIR sensor on an airborne platform. This example shows a total of six identified points of interest within a defined grid 406 that is used as a search pattern. Two of the areas of interest 402 have been analyzed and labeled "Rock" while four other areas of interest 404 have not yet been analyzed. In this embodiment, the areas of interest are also listed on a separate chart 408 shown on the image display 400. This provides a quick reference for the user to assist in tracking the areas of interest. In other embodiments, an overlay (e.g., transparent, color coded, tag indicators, etc.) is used to indicate the areas that have been searched or not searched. This assists the operator by avoiding searching the same area multiple times.

Once the operator has adjusted the camera sensitivity and made other adjustments that localize hot spots, the operator can proceed with examining each area of interest. Additionally, the operator can choose to have the system create a search pattern that create the shortest path for moving between spots. This search pattern may be selected from a variety of pre-set patterns or could be determined by the operator simply by manually selecting an area of interest in the zoomed out wide area view. The operator is then presented with controls that let them select the next spot instead of manually moving the camera view to focus on each spot. This would allow the operator to stay zoomed in, saving them the time in zooming out between areas of interest in order to select the next one to investigate. As each area is examined, the operator can then tag it as "done" so that the areas that have been covered are annotated when zooming out to view the big picture. Further, operators can enter annotated labels for each area of interest. The user controls may be traditional buttons and knobs, touch-screen, 3D gesture, or voice-activated in alternative embodiments.

In alternative embodiments, the system may receive global positioning system (GPS) and laser range finder data that geolocates areas of interest on the ground within the camera view. Prior searched areas may be indicated by several means, including: overlaying a virtual grid; changing the color of the searched area; and outlining the searched area, reference points, and other markers. For example, a virtual grid can be overlaid on the image display and held in place using location data. This enables the operator to use the grid to ensure the entire space has been search that all target areas are properly analyzed.

Further, areas of interest can be tagged (e.g., color, symbols, labels) to indicate the type of object (e.g., tree, rock) and prevent the same type of object from being identified multiple times. This tagging may use manual annotation by the operator or automatic image recognition. In addition, video analytics can look at the camera image and create an optimum path between areas of interest so as to minimize the time required to analyze them all. Different search paths could be user-selectable with respect to the search patten such as a standard grid, expanding spiral, raster-scan, etc. Other embodiments may use alternative types of image displays such as Augmented and Virtual Reality (VR) headsets, HUD, and separate computer displays. The various overlays (e.g., grid system, color map) to the image displays might be an automatic selection or user selectable.

Figure 5:
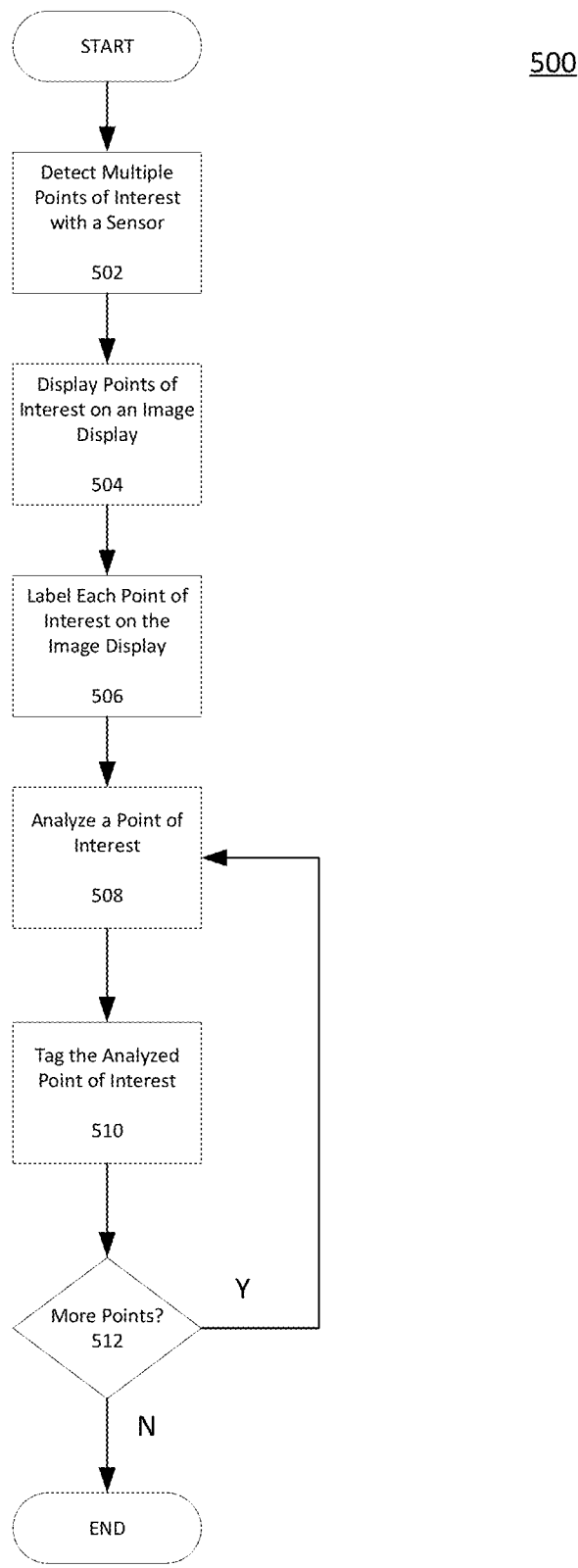
FIG. 5 shows a flowchart depicting a method for aiding searches with an imaging sensor from a sensor platform in accordance with one embodiment.

Turning now to FIG. 5, a flowchart 500 is shown depicting a method for aiding searches with an imaging sensor from a sensor platform in accordance with one embodiment. The method comprises utilizing the imaging sensor to detect multiple points of interest 502 from the sensor platform. The multiple points of interest are displayed on an image display 504 shown on a display device. Each point of interest is labeled on the image display 506 and analyzed separately 508 to determine details of the point of interest. Each analyzed point of interest is tagged on the image display 510 and 512 with a distinctive marker to indicate completion of the analysis for that point of interest.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for aiding in searches with an imaging sensor from a sensor platform, comprising:
   utilizing the imaging sensor to detect multiple points of interest from the sensor platform;
   displaying the multiple points of interest on an image display shown on a display device;
   labeling each point of interest on the image display;
   automatically creating an optimized search pattern with a video analytics system for the multiple points of interest;
   analyzing each point of interest separately on the image display to determine a type of object within each point of interest; and
   tagging each analyzed point of interest on the image display with a distinctive marker to indicate completion of the analysis for the analyzed point of interest.

2. The method of claim 1, where the imaging sensor comprises a forward looking infrared (FLIR) sensor.

3. The method of claim 1, where the imaging sensor comprises a radio detection and ranging (RADAR) sensor.

4. The method of claim 1, where the imaging sensor comprises a light detection and ranging (LIDAR).

5. The method of claim 1, where the imaging sensor comprises a sound navigation and ranging (SONAR).

6. The method of claim 1, where the imaging sensor comprises a night vision light amplification sensor.

7. The method of claim 1, where the sensor platform comprises an aircraft.

8. The method of claim 1, where the sensor platform comprises a helicopter.

9. The method of claim 1, where the sensor platform comprises an unmanned aerial vehicle (UAV).

10. The method of claim 9, where the UAV comprises a remotely piloted vehicle (RPV).

11. The method of claim 1, where the sensor platform comprises an elevated observation tower.

12. A system for aiding in searches from a sensor platform, comprising:
    an imaging sensor that detects multiple points of interest from the sensor platform; and
    a display device on board the sensor platform that displays the multiple points of interest on an image display, where the display device allows a user to,
    label each point of interest on the image display,
    automatically create an optimized search pattern with a video analytics system for the multiple points of interest,
    analyze each point of interest separately on the image display to determine a type of object within each point of interest, and
    tag each analyzed point of interest on the image display with a distinctive marker to indicate completion of the analysis for the analyzed point of interest.

13. The system of claim 12, where the imaging sensor comprises a forward looking infrared (FLIR) sensor.

14. The system of claim 12, where the imaging sensor comprises a radio detection and ranging (RADAR) sensor.

15. The system of claim 12, where the imaging sensor comprises a light detection and ranging (LIDAR).

16. The system of claim 12, where the imaging sensor comprises a sound navigation and ranging (SONAR).

17. The system of claim 12, where the imaging sensor comprises a night vision light amplification sensor.

18. The system of claim 12, where the sensor platform comprises an aircraft.

19. The system of claim 12, where the sensor platform comprises a helicopter.

20. The system of claim 12, where the sensor platform comprises an unmanned aerial vehicle (UAV).

* * * * *